US012009141B2

(12) United States Patent
Fujita et al.

(10) Patent No.: US 12,009,141 B2
(45) Date of Patent: Jun. 11, 2024

(54) INDUCTOR COMPONENT

(71) Applicant: Murata Manufacturing Co., Ltd., Kyoto-fu (JP)

(72) Inventors: Yoshihiro Fujita, Nagaokakyo (JP); Yasuo Matsumoto, Nagaokakyo (JP); Hiromi Miyoshi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 537 days.

(21) Appl. No.: 17/149,374

(22) Filed: Jan. 14, 2021

(65) Prior Publication Data

US 2021/0217553 A1 Jul. 15, 2021

(30) Foreign Application Priority Data

Jan. 15, 2020 (JP) ................................ 2020-004299

(51) Int. Cl.
*H01F 5/00* (2006.01)
*H01F 27/28* (2006.01)
*H01F 27/29* (2006.01)
*H01F 41/04* (2006.01)

(52) U.S. Cl.
CPC ......... *H01F 27/2804* (2013.01); *H01F 27/29* (2013.01); *H01F 41/041* (2013.01); *H01F 2027/2809* (2013.01)

(58) Field of Classification Search
CPC .................................................. H01F 27/2804
USPC ......................................................... 336/200
See application file for complete search history.

(56) References Cited

U.S. PATENT DOCUMENTS

2001/0019176 A1* 9/2001 Ahiko .................... H01G 4/232 257/772
2016/0372261 A1* 12/2016 Ozawa ................ H01F 17/0013
2020/0090853 A1* 3/2020 Yang .................. H01F 27/2804

FOREIGN PATENT DOCUMENTS

| | | | |
|---|---|---|---|
| CN | 110459389 | A | 11/2019 |
| CN | 110690032 | A | 1/2020 |
| JP | 2014-022723 | A | 2/2014 |
| JP | 2019-075537 | A | 5/2019 |
| JP | 2019-102792 | A | 6/2019 |
| JP | 6569834 | B1 | 9/2019 |
| JP | 2019-186525 | A | 10/2019 |
| JP | 2019-197781 | A | 11/2019 |
| JP | 2019-207915 | A | 12/2019 |
| WO | 2012/172939 | A1 | 12/2012 |

* cited by examiner

*Primary Examiner* — Ronald Hinson
(74) *Attorney, Agent, or Firm* — Studebaker & Brackett PC

(57) ABSTRACT

An inductor component includes a base having a columnar shape and including a mounting surface parallel with a length direction being a longitudinal direction of the columnar shape and with a width direction orthogonal to the length direction, inductor wiring arranged inside the base, a first outer electrode connected to the inductor wiring and disposed on the mounting surface, and a second outer electrode connected to the inductor wiring and disposed on the mounting surface, the first outer electrode and the second outer electrode arranged in the length direction. When a maximum dimension of the mounting surface in the length direction is L, a maximum dimension of the first outer electrode in the width direction is a, and a maximum dimension of the second outer electrode in the width direction is b, a≤L/2<W and b≤L/2<W.

8 Claims, 4 Drawing Sheets

INDUCTOR COMPONENT

CROSS-REFERENCE TO RELATED APPLICATION

This application claims benefit of priority to Japanese Patent Application No. 2020-004299, filed Jan. 15, 2020, the entire content of which is incorporated herein by reference.

BACKGROUND

Technical Field

The present disclosure relates to an inductor component.

Background Art

An inductor component described in International Publication No. 2012/172939 has a base having a rectangular prism shape. Inductor wiring is arranged inside the base. Both end portions of the inductor wiring are exposed to the outside of the base. Each of both end portions of the inductor wiring is connected to an outer electrode. The outer electrodes cover the end portions of the inductor wiring, and the two outer electrodes are arranged on a mounting surface of the base. The dimension of the base in the length direction, which is its longitudinal direction, is 0.6 mm, and the dimension of the base in the width direction is 0.3 mm. The dimension of each of the outer electrodes in the width direction is 0.28 mm.

SUMMARY

The inductor component described in the above-mentioned patent document is mounted such that the positions of the outer electrodes are matched with lands being conductive electrodes disposed on a substrate. There are standard sizes for passive components, such as inductor components, and an example of the standard sizes may be a certain size in which the dimension of the base in the width direction is half the dimension of the base in the length direction. Typically, land patterns with the sizes and intervals corresponding to that standard size are disposed on the substrate. Some passive components may include a base having dimensions in the length direction and in the width direction other than the standard size. To replace the standard-size component with such a nonstandard-size component, the shape of the land patterns on the substrate also needs to be changed from that in the standard-size component. Thus, the use of the nonstandard-size component causes an increase in the replacement cost for changing the land patterns described above on the user side.

In addition, for the inductor component described in the above-described patent document, improvements in the inductance and Q value of the inductor component are necessary. As previously described, if the dimensions of the base in the length direction and in the width direction are designed freely, it is impossible to share the land patterns with the standard-size component. On the other hand, because the dimension of the base in the height direction orthogonal to the length direction and the width direction can be designed independently of the mounting surface, which is to be mounted on the substrate, the dimension in the height direction, which does not affect the land patterns, has been increased to enlarge the size of the base.

With the changing of the dimension of the base in the height direction alone, however, there is a limit to the improvement in the characteristics of the inductor component. If the dimensions of the base in the length direction and in the width direction are changed, the likelihood of changing the land patterns on the substrate is raised.

According to preferred embodiments of the present disclosure, an inductor component includes a base, inductor wiring, a first outer electrode, and a second outer electrode. The base has a columnar shape and includes a mounting surface parallel with a length direction being a longitudinal direction of the columnar shape and with a width direction orthogonal to the length direction. The inductor wiring is arranged inside the base. The first outer electrode is connected to the inductor wiring and disposed on the mounting surface. The second outer electrode is connected to the inductor wiring and disposed on the mounting surface. The first outer electrode and the second outer electrode are arranged in the length direction. When a maximum dimension of the mounting surface in the length direction is L, a maximum dimension of the first outer electrode in the width direction is a, and a maximum dimension of the second outer electrode in the width direction is b, $a \leq L/2 < W$ and $b \leq L/2 < W$.

In the above-described configuration, because $L/2 < W$, W can be larger than a specified size, such as a standard size. Because $a \leq L/2$ and $b \leq L/2$, the dimension of each of the first outer electrode and the second outer electrode in the width direction can fit the specified size, such as the standard size. Therefore, the characteristics of the inductor component can be improved, and because it is not necessary to change land patterns for replacement for a component with the specified size, such as the standard size, the cost of the replacement of the component can be decreased.

Accordingly, the characteristics of the inductor component can be improved, and the likelihood of changing the land patterns on the substrate can be decreased.

Other features, elements, characteristics and advantages of the present disclosure will become more apparent from the following detailed description of preferred embodiments of the present disclosure with reference to the attached drawings.

DETAILED DESCRIPTION

Figure 1:
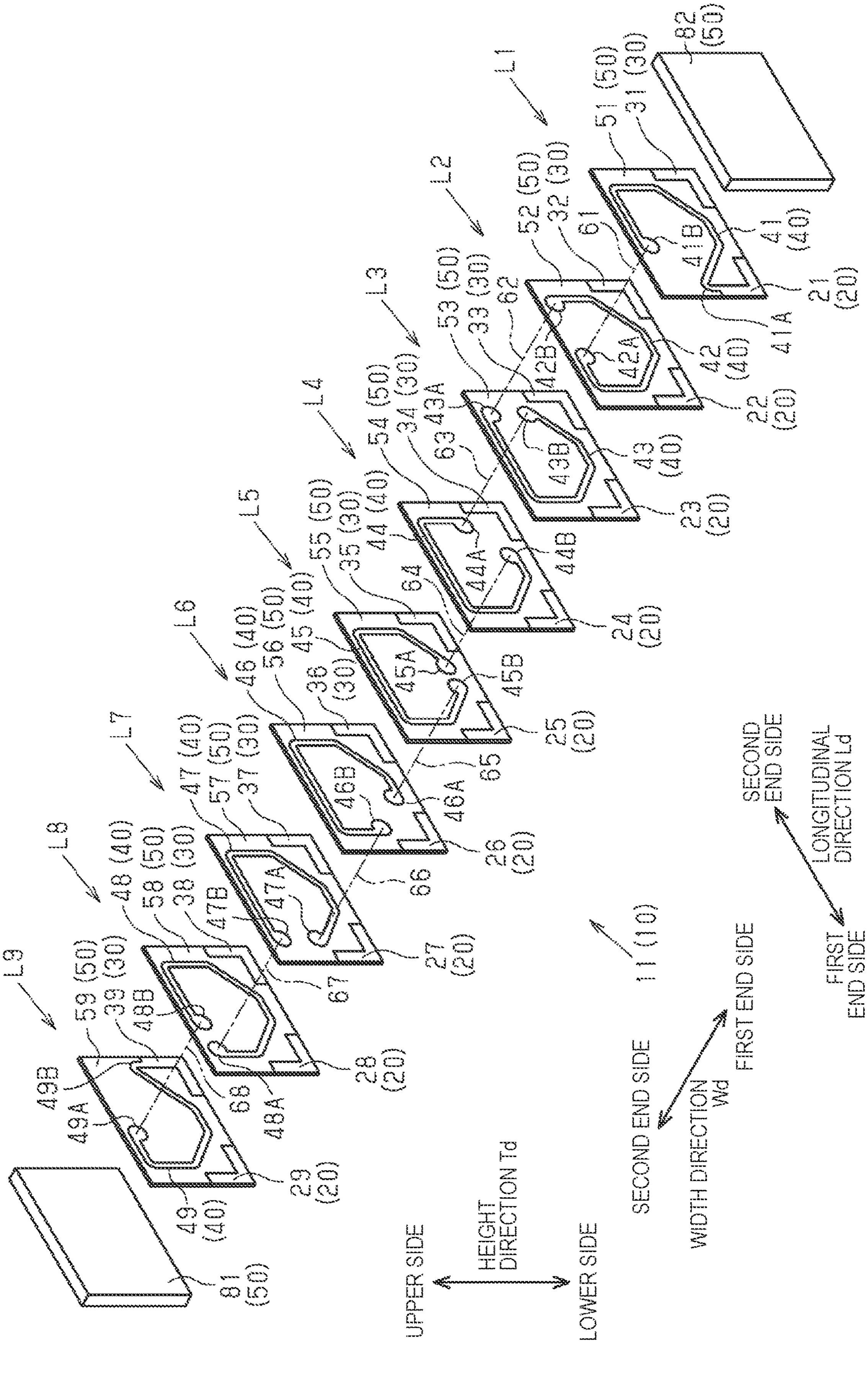
FIG. 1 is an exploded perspective view of a base.

An embodiment of an inductor component is described below. In the drawings, constituent elements may be illustrated in an enlarged manner to facilitate the understanding. The dimensional ratios of the constituent elements may differ from real ones or ones in a different drawing.

As illustrated in FIG. 1, an inductor component 10 has a structure in which a plurality of planar layers are laminated as a whole. Each of the layers has a substantially rectangular shape in plan view. In the following description, a direction of a normal line orthogonal to a principal surface direction of the plurality of layers is described as a width direction Wd. That is, the direction in which the plurality of layers are laminated coincides with the width direction Wd. A direction in which the long sides of the principal surfaces of each of the layers having the substantially rectangular shape in plan view extend is defined as a length direction Ld, and a direction in which their short sides extend is defined as a height direction Td. That is, as seen from the lamination direction of the layers, the direction in which the long sides of the substantially rectangular shape extend is the length direction Ld, and the direction in which the short sides of the substantially rectangular shape extend is the height direction Td.

A first layer L1 includes a first electrode layer 21, a second electrode layer 31, first inductor wiring 41, and a first insulating layer 51. The first electrode layer 21 is made of a conductive material, such as silver, copper, or gold, and has a substantially L shape as a whole. The first electrode layer 21 is arranged on a corner among the four corners of the first layer L1 having the substantially rectangular shape in plan view, the corner positioned on a first end side in the length direction Ld and being lower in the height direction Td. The first electrode layer 21 is exposed to the outside of the first layer L1 in a section lower in the height direction Td with respect to substantially the center of the short side on the first end side in the length direction Ld and in a section on the first end side in the length direction Ld with respect to substantially the center of the lower long side in the height direction Td among the four sides of the first layer L1 having the substantially rectangular shape in plan view.

The second electrode layer 31 is made of a conductive material, such as silver, copper, or gold, and has a substantially L shape as a whole. The second electrode layer 31 is arranged on a corner among the four corners of the first layer L1 having the substantially rectangular shape in plan view, the corner positioned on a second end side in the length direction Ld and being lower in the height direction Td. Accordingly, the second electrode layer 31 has the substantially L shape substantially symmetrical with the first electrode layer 21 in the length direction Ld. The second electrode layer 31 is exposed to the outside of the first layer L1 in a section lower in the height direction Td with respect to substantially the center of the short side on the second end side in the length direction Ld and in a section on the second end side in the length direction Ld with respect to substantially the center of the lower long side in the height direction Td among the four sides of the first layer L1 having the substantially rectangular shape in plan view.

The first inductor wiring 41 is made of a conductive material, such as silver, copper, or gold, and extends in a spiral shape whose center is substantially the center of the first layer L1 having the substantially rectangular shape in plan view as a whole. Specifically, a first end portion 41A of the first inductor wiring 41 is connected to an upper end of the first electrode layer 21 in the height direction Td. The wiring width of the first inductor wiring 41 is approximately uniform, except for a second end portion 41B, and is smaller than that of the first electrode layer 21. The second end portion 41B of the first inductor wiring 41 is arranged above substantially the center in the height direction Td and in the vicinity of substantially the center in the length direction Ld. The first inductor wiring 41 is wound counterclockwise from the first end portion 41A toward the second end portion 41B as seen from the first end side in the width direction Wd. The first inductor wiring 41 is exposed to the outside of the first layer L1 on its both sides in the width direction Wd.

The second end portion 41B of the first inductor wiring 41 functions as a pad and has a substantially circular shape in plan view. The wiring width of the second end portion 41B of the first inductor wiring 41 is larger than that of the other portion of the first inductor wiring 41.

The portion other than the first electrode layer 21, the second electrode layer 31, and the first inductor wiring 41 in the first layer L1 is the first insulating layer 51, which is an insulator, such as glass, resin, or alumina.

Although not illustrated in FIG. 1, a layer of an insulator, such as glass, resin, or alumina, is laminated on the second end side in the width direction Wd of the first layer L1. That insulator layer has the same substantially rectangular shape as that of the first layer L1 in plan view. That insulator layer is mostly the insulator and has a first via 61 made of a conductive material, such as silver, copper, or gold, disposed in a position corresponding to the second end portion 41B of the first inductor wiring 41 in the first layer L1. The first via 61 has a substantially circular shape in plan view and is connected to the second end portion 41B of the first inductor wiring 41 in the first layer L1. In FIG. 1, a connection relation between different wiring elements by the first via 61 is virtually indicated by the dash-dot line. In that insulator layer, a via made of a conductive material, such as silver, copper, or gold, is disposed in each of a position corresponding to the first electrode layer 21 in the first layer L1 and a position corresponding to the second electrode layer 31.

A second layer L2 having the same substantially rectangular shape in plan view as that of the first layer L1 is laminated on the second end side in the width direction Wd of the layer including the first via 61. The second layer L2 includes a third electrode layer 22, a fourth electrode layer 32, second inductor wiring 42, and a second insulating layer 52.

The third electrode layer 22 is made of the same material as that of the first electrode layer 21, has the same shape as that of the first electrode layer 21, and is arranged on the second end side in the width direction Wd of the first electrode layer 21. The fourth electrode layer 32 is made of the same material as that of the second electrode layer 31, has the same shape as that of the second electrode layer 31, and is arranged on the second end side in the width direction Wd of the second electrode layer 31.

The second inductor wiring 42 is made of a conductive material, such as silver, copper, or gold, and extends in a spiral shape whose center is substantially the center of the second layer L2 having the substantially rectangular shape in plan view as a whole. Specifically, a first end portion 42A of the second inductor wiring 42 is arranged on the second end side in the width direction Wd of the first via 61. The first end portion 42A of the second inductor wiring 42 is connected to the first via 61. A second end portion 42B of the second inductor wiring 42 is arranged above substantially the center in the height direction Td and on the second end side with respect to substantially the center in the length direction Ld. The wiring width of each of the first end portion 42A and the second end portion 42B of the second inductor wiring 42 is larger than that of the portion between the first end portion 42A and the second end portion 42B. The second inductor wiring 42 is wound counterclockwise from the first end portion 42A toward the second end portion 42B as seen from the first end side in the width direction Wd. The second inductor wiring 42 is exposed to the outside of the second layer L2 on its both sides in the width direction Wd.

The portion other than the third electrode layer 22, the fourth electrode layer 32, and the second inductor wiring 42 in the second layer L2 is the second insulating layer 52, which is an insulator, such as glass, resin, or alumina.

Although not illustrated in FIG. 1, a layer of an insulator, such as glass, resin, or alumina, is laminated on the second end side in the width direction Wd of the second layer L2.

That insulator layer has the same substantially rectangular shape as that of the second layer L2 in plan view. That insulator layer is mostly the insulator and has a second via 62 made of a conductive material, such as silver, copper, or gold, disposed in a position corresponding to the second end portion 42B of the second inductor wiring 42 in the second layer L2. The second via 62 has a substantially circular shape in plan view and is connected to the second end portion 42B of the second inductor wiring 42 in the second layer L2. In FIG. 1, a connection relation between different wiring elements by the second via 62 is virtually indicated by the dash-dot line. In that insulator layer, a via made of a conductive material, such as silver, copper, or gold, is disposed in each of a position corresponding to the third electrode layer 22 in the second layer L2 and a position corresponding to the fourth electrode layer 32.

A third layer L3 having the same substantially rectangular shape in plan view as that of the second layer L2 is laminated on the second end side in the width direction Wd of the layer including the second via 62. The third layer L3 includes a fifth electrode layer 23, a sixth electrode layer 33, third inductor wiring 43, and a third insulating layer 53.

The fifth electrode layer 23 is made of the same material as that of the third electrode layer 22, has the same shape as that of the third electrode layer 22, and is arranged on the second end side in the width direction Wd of the third electrode layer 22. The sixth electrode layer 33 is made of the same material as that of the fourth electrode layer 32, has the same shape as that of the fourth electrode layer 32, and is arranged on the second end side in the width direction Wd of the fourth electrode layer 32.

The third inductor wiring 43 is made of a conductive material, such as silver, copper, or gold, and extends in a spiral shape whose center is substantially the center of the third layer L3 having the substantially rectangular shape in plan view as a whole. Specifically, a first end portion 43A of the third inductor wiring 43 is arranged on the second end side in the width direction Wd of the second via 62. The first end portion 43A of the third inductor wiring 43 is connected to the second via 62. A second end portion 43B of the third inductor wiring 43 is arranged in the vicinity of substantially the center in the height direction Td and on the second end side with respect to substantially the center in the length direction Ld. The wiring width of each of the first end portion 43A and the second end portion 43B of the third inductor wiring 43 is larger than that of the portion between the first end portion 43A and the second end portion 43B. The third inductor wiring 43 is wound counterclockwise from the first end portion 43A toward the second end portion 43B as seen from the first end side in the width direction Wd. The third inductor wiring 43 is exposed to the outside of the third layer L3 on its both sides in the width direction Wd.

The portion other than the fifth electrode layer 23, the sixth electrode layer 33, and the third inductor wiring 43 in the third layer L3 is the third insulating layer 53, which is an insulator, such as glass, resin, or alumina.

Although not illustrated in FIG. 1, a layer of an insulator, such as glass, resin, or alumina, is laminated on the second end side in the width direction Wd of the third layer L3. That insulator layer has the same substantially rectangular shape as that of the third layer L3 in plan view. That insulator layer is mostly the insulator and has a third via 63 made of a conductive material, such as silver, copper, or gold, disposed in a position corresponding to the second end portion 43B of the third inductor wiring 43 in the third layer L3. The third via 63 has a substantially circular shape in plan view and is connected to the second end portion 43B of the third inductor wiring 43 in the third layer L3. In FIG. 1, a connection relation between different wiring elements by the third via 63 is virtually indicated by the dash-dot line. In that insulator layer, a via made of a conductive material, such as silver, copper, or gold, is disposed in each of a position corresponding to the fifth electrode layer 23 in the third layer L3 and a position corresponding to the sixth electrode layer 33.

A fourth layer L4 having the same substantially rectangular shape in plan view as that of the third layer L3 is laminated on the second end side in the width direction Wd of the layer including the third via 63. The fourth layer L4 includes a seventh electrode layer 24, an eighth electrode layer 34, fourth inductor wiring 44, and a fourth insulating layer 54.

The seventh electrode layer 24 is made of the same material as that of the fifth electrode layer 23, has the same shape as that of the fifth electrode layer 23, and is arranged on the second end side in the width direction Wd of the fifth electrode layer 23. The eighth electrode layer 34 is made of the same material as that of the sixth electrode layer 33, has the same shape as that of the sixth electrode layer 33, and is arranged on the second end side in the width direction Wd of the sixth electrode layer 33.

The fourth inductor wiring 44 is made of a conductive material, such as silver, copper, or gold, and extends in a spiral shape whose center is substantially the center of the fourth layer L4 having the substantially rectangular shape in plan view as a whole. Specifically, a first end portion 44A of the fourth inductor wiring 44 is arranged on the second end side in the width direction Wd of the third via 63. The first end portion 44A of the fourth inductor wiring 44 is connected to the third via 63. A second end portion 44B of the fourth inductor wiring 44 is arranged below substantially the center in the height direction Td, on the second end side with respect to substantially the center in the length direction Ld, and on the first end side with respect to the eighth electrode layer 34. The wiring width of each of the first end portion 44A and the second end portion 44B of the fourth inductor wiring 44 is larger than that of the portion between the first end portion 44A and the second end portion 44B. The fourth inductor wiring 44 is wound counterclockwise from the first end portion 44A toward the second end portion 44B as seen from the first end side in the width direction Wd. The fourth inductor wiring 44 is exposed to the outside of the fourth layer L4 on its both sides in the width direction Wd.

The portion other than the seventh electrode layer 24, the eighth electrode layer 34, and the fourth inductor wiring 44 in the fourth layer L4 is the fourth insulating layer 54, which is an insulator, such as glass, resin, or alumina.

Although not illustrated in FIG. 1, a layer of an insulator, such as glass, resin, or alumina, is laminated on the second end side in the width direction Wd of the fourth layer L4. That insulator layer has the same substantially rectangular shape as that of the fourth layer L4 in plan view. That insulator layer is mostly the insulator and has a fourth via 64 made of a conductive material, such as silver, copper, or gold, disposed in a position corresponding to the second end portion 44B of the fourth inductor wiring 44 in the fourth layer L4. The fourth via 64 has a substantially circular shape in plan view and is connected to the second end portion 44B of the fourth inductor wiring 44 in the fourth layer L4. In FIG. 1, a connection relation between different wiring elements by the fourth via 64 is virtually indicated by the dash-dot line. In that insulator layer, a via made of a conductive material, such as silver, copper, or gold, is disposed in each of a position corresponding to the seventh electrode layer 24 in the fourth layer L4 and a position corresponding to the eighth electrode layer 34.

A fifth layer L5 having the same substantially rectangular shape in plan view as that of the fourth layer L4 is laminated on the second end side in the width direction Wd of the layer including the fourth via 64. The fifth layer L5 includes a ninth electrode layer 25, a tenth electrode layer 35, fifth inductor wiring 45, and a fifth insulating layer 55.

The ninth electrode layer 25 is made of the same material as that of the seventh electrode layer 24, has the same shape as that of the seventh electrode layer 24, and is arranged on the second end side in the width direction Wd of the seventh electrode layer 24. The tenth electrode layer 35 is made of the same material as that of the eighth electrode layer 34, has the same shape as that of the eighth electrode layer 34, and is arranged on the second end side in the width direction Wd of the eighth electrode layer 34.

The fifth inductor wiring 45 is made of a conductive material, such as silver, copper, or gold, and extends in a spiral shape whose center is substantially the center of the fifth layer L5 having the substantially rectangular shape in plan view as a whole. Specifically, a first end portion 45A of the fifth inductor wiring 45 is arranged on the second end side in the width direction Wd of the fourth via 64. The first end portion 45A of the fifth inductor wiring 45 is connected to the fourth via 64. A second end portion 45B of the fifth inductor wiring 45 is arranged below substantially the center in the height direction Td, on the first end side with respect to substantially the center in the length direction Ld, and on the second end side with respect to the ninth electrode layer 25. The wiring width of each of the first end portion 45A and the second end portion 45B of the fifth inductor wiring 45 is larger than that of the portion between the first end portion 45A and the second end portion 45B. The fifth inductor wiring 45 is wound counterclockwise from the first end portion 45A toward the second end portion 45B as seen from the first end side in the width direction Wd. The fifth inductor wiring 45 is exposed to the outside of the fifth layer L5 on its both sides in the width direction Wd.

The portion other than the ninth electrode layer 25, the tenth electrode layer 35, and the fifth inductor wiring 45 in the fifth layer L5 is the fifth insulating layer 55, which is an insulator, such as glass, resin, or alumina.

Although not illustrated in FIG. 1, a layer of an insulator, such as glass, resin, or alumina, is laminated on the second end side in the width direction Wd of the fifth layer L5. That insulator layer has the same substantially rectangular shape as that of the fifth layer L5 in plan view. That insulator layer is mostly the insulator and has a fifth via 65 made of a conductive material, such as silver, copper, or gold, disposed in a position corresponding to the second end portion 45B of the fifth inductor wiring 45 in the fifth layer L5. The fifth via 65 has a substantially circular shape in plan view and is connected to the second end portion 45B of the fifth inductor wiring 45 in the fifth layer L5. In FIG. 1, a connection relation between different wiring elements by the fifth via 65 is virtually indicated by the dash-dot line. In that insulator layer, a via made of a conductive material, such as silver, copper, or gold, is disposed in each of a position corresponding to the ninth electrode layer 25 in the fifth layer L5 and a position corresponding to the tenth electrode layer 35.

A sixth layer L6 having the same substantially rectangular shape in plan view as that of the fifth layer L5 is laminated on the second end side in the width direction Wd of the layer including the fifth via 65. The sixth layer L6 includes an 11th electrode layer 26, a 12th electrode layer 36, sixth inductor wiring 46, and a sixth insulating layer 56.

The 11th electrode layer 26 is made of the same material as that of the ninth electrode layer 25, has the same shape as that of the ninth electrode layer 25, and is arranged on the second end side in the width direction Wd of the ninth electrode layer 25. The 12th electrode layer 36 is made of the same material as that of the tenth electrode layer 35, has the same shape as that of the tenth electrode layer 35, and is arranged on the second end side in the width direction Wd of the tenth electrode layer 35.

The sixth inductor wiring 46 is made of a conductive material, such as silver, copper, or gold, and extends in a spiral shape whose center is substantially the center of the sixth layer L6 having the substantially rectangular shape in plan view as a whole. Specifically, a first end portion 46A of the sixth inductor wiring 46 is arranged on the second end side in the width direction Wd of the fifth via 65. The first end portion 46A of the sixth inductor wiring 46 is connected to the fifth via 65. A second end portion 46B of the sixth inductor wiring 46 is arranged in the vicinity of substantially the center in the height direction Td and on the first end side with respect to substantially the center in the length direction Ld. The wiring width of each of the first end portion 46A and the second end portion 46B of the sixth inductor wiring 46 is larger than that of the portion between the first end portion 46A and the second end portion 46B. The sixth inductor wiring 46 is wound counterclockwise from the first end portion 46A toward the second end portion 46B as seen from the first end side in the width direction Wd. The sixth inductor wiring 46 is exposed to the outside of the sixth layer L6 on its both sides in the width direction Wd.

The portion other than the 11th electrode layer 26, the 12th electrode layer 36, and the sixth inductor wiring 46 in the sixth layer L6 is the sixth insulating layer 56, which is an insulator, such as glass, resin, or alumina.

Although not illustrated in FIG. 1, a layer of an insulator, such as glass, resin, or alumina, is laminated on the second end side in the width direction Wd of the sixth layer L6. That insulator layer has the same substantially rectangular shape as that of the sixth layer L6 in plan view. That insulator layer is mostly the insulator and has a sixth via 66 made of a conductive material, such as silver, copper, or gold, disposed in a position corresponding to the second end portion 46B of the sixth inductor wiring 46 in the sixth layer L6. The sixth via 66 has a substantially circular shape in plan view and is connected to the second end portion 46B of the sixth inductor wiring 46 in the sixth layer L6. In FIG. 1, a connection relation between different wiring elements by the sixth via 66 is virtually indicated by the dash-dot line. In that insulator layer, a via made of a conductive material, such as silver, copper, or gold, is disposed in each of a position corresponding to the 11th electrode layer 26 in the sixth layer L6 and a position corresponding to the 12th electrode layer 36.

A seventh layer L7 having the same substantially rectangular shape in plan view as that of the sixth layer L6 is laminated on the second end side in the width direction Wd of the layer including the sixth via 66. The seventh layer L7 includes a 13th electrode layer 27, a 14th electrode layer 37, seventh inductor wiring 47, and a seventh insulating layer 57.

The 13th electrode layer 27 is made of the same material as that of the 11th electrode layer 26, has the same shape as that of the 11th electrode layer 26, and is arranged on the second end side in the width direction Wd of the 11th electrode layer 26. The 14th electrode layer 37 is made of the same material as that of the 12th electrode layer 36, has the same shape as that of the 12th electrode layer 36, and is arranged on the second end side in the width direction Wd of the 12th electrode layer 36.

The seventh inductor wiring 47 is made of a conductive material, such as silver, copper, or gold, and extends in a spiral shape whose center is substantially the center of the seventh layer L7 having the substantially rectangular shape in plan view as a whole. Specifically, a first end portion 47A of the seventh inductor wiring 47 is arranged on the second end side in the width direction Wd of the sixth via 66. The first end portion 47A of the seventh inductor wiring 47 is connected to the sixth via 66. A second end portion 47B of the seventh inductor wiring 47 is arranged above substantially the center in the height direction Td and on the first end side with respect to substantially the center in the length direction Ld. The wiring width of each of the first end portion 47A and the second end portion 47B of the seventh inductor wiring 47 is larger than that of the portion between the first end portion 47A and the second end portion 47B. The seventh inductor wiring 47 is wound counterclockwise from the first end portion 47A toward the second end portion 47B as seen from the first end side in the width direction Wd. The seventh inductor wiring 47 is exposed to the outside of the seventh layer L7 on its both sides in the width direction Wd.

The portion other than the 13th electrode layer 27, the 14th electrode layer 37, and the seventh inductor wiring 47 in the seventh layer L7 is the seventh insulating layer 57, which is an insulator, such as glass, resin, or alumina.

Although not illustrated in FIG. 1, a layer of an insulator, such as glass, resin, or alumina, is laminated on the second end side in the width direction Wd of the seventh layer L7. That insulator layer has the same substantially rectangular shape as that of the seventh layer L7 in plan view. That insulator layer is mostly the insulator and has a seventh via 67 made of a conductive material, such as silver, copper, or gold, disposed in a position corresponding to the second end portion 47B of the seventh inductor wiring 47 in the seventh layer L7. The seventh via 67 has a substantially circular shape in plan view and is connected to the second end portion 47B of the seventh inductor wiring 47 in the seventh layer L7. In FIG. 1, a connection relation between different wiring elements by the seventh via 67 is virtually indicated by the dash-dot line. In that insulator layer, a via made of a conductive material, such as silver, copper, or gold, is disposed in each of a position corresponding to the 13th electrode layer 27 in the seventh layer L7 and a position corresponding to the 14th electrode layer 37.

An eighth layer L8 having the same substantially rectangular shape in plan view as that of the seventh layer L7 is laminated on the second end side in the width direction Wd of the layer including the seventh via 67. The eighth layer L8 includes a 15th electrode layer 28, a 16th electrode layer 38, eighth inductor wiring 48, and an eighth insulating layer 58.

The 15th electrode layer 28 is made of the same material as that of the 13th electrode layer 27, has the same shape as that of the 13th electrode layer 27, and is arranged on the second end side in the width direction Wd of the 13th electrode layer 27. The 16th electrode layer 38 is made of the same material as that of the 14th electrode layer 37, has the same shape as that of the 14th electrode layer 37, and is arranged on the second end side in the width direction Wd of the 14th electrode layer 37.

The eighth inductor wiring 48 is made of a conductive material, such as silver, copper, or gold, and extends in a spiral shape whose center is substantially the center of the eighth layer L8 having the substantially rectangular shape in plan view as a whole. Specifically, a first end portion 48A of the eighth inductor wiring 48 is arranged on the second end side in the width direction Wd of the seventh via 67. The first end portion 48A of the eighth inductor wiring 48 is connected to the seventh via 67. A second end portion 48B of the eighth inductor wiring 48 is arranged above substantially the center in the height direction Td and in the vicinity of substantially the center in the length direction Ld. The wiring width of each of the first end portion 48A and the second end portion 48B of the eighth inductor wiring 48 is larger than that of the portion between the first end portion 48A and the second end portion 48B. The eighth inductor wiring 48 is wound counterclockwise from the first end portion 48A toward the second end portion 48B as seen from the first end side in the width direction Wd. The eighth inductor wiring 48 is exposed to the outside of the eighth layer L8 on its both sides in the width direction Wd.

The portion other than the 15th electrode layer 28, the 16th electrode layer 38, and the eighth inductor wiring 48 in the eighth layer L8 is the eighth insulating layer 58, which is an insulator, such as glass, resin, or alumina.

Although not illustrated in FIG. 1, a layer of an insulator, such as glass, resin, or alumina, is laminated on the second end side in the width direction Wd of the eighth layer L8. That insulator layer has the same substantially rectangular shape as that of the eighth layer L8 in plan view. That insulator layer is mostly the insulator and has an eighth via 68 made of a conductive material, such as silver, copper, or gold, disposed in a position corresponding to the second end portion 48B of the eighth inductor wiring 48 in the eighth layer L8. The eighth via 68 has a substantially circular shape in plan view and is connected to the second end portion 48B of the eighth inductor wiring 48 in the eighth layer L8. In FIG. 1, a connection relation between different wiring elements by the eighth via 68 is virtually indicated by the dash-dot line. In that insulator layer, a via made of a conductive material, such as silver, copper, or gold, is disposed in each of a position corresponding to the 15th electrode layer 28 in the eighth layer L8 and a position corresponding to the 16th electrode layer 38.

A ninth layer L9 having the same substantially rectangular shape in plan view as that of the eighth layer L8 is laminated on the second end side in the width direction Wd of the layer including the eighth via 68. The ninth layer L9 includes a 17th electrode layer 29, an 18th electrode layer 39, ninth inductor wiring 49, and a ninth insulating layer 59.

The 17th electrode layer 29 is made of the same material as that of the 15th electrode layer 28, has the same shape as that of the 15th electrode layer 28, and is arranged on the second end side in the width direction Wd of the 15th electrode layer 28. The 18th electrode layer 39 is made of the same material as that of the 16th electrode layer 38, has the same shape as that of the 16th electrode layer 38, and is arranged on the second end side in the width direction Wd of the 16th electrode layer 38.

The ninth inductor wiring 49 is made of a conductive material, such as silver, copper, or gold, and extends in a spiral shape whose center is substantially the center of the ninth layer L9 having the substantially rectangular shape in plan view as a whole. Specifically, a first end portion 49A of the ninth inductor wiring 49 is arranged on the second end side in the width direction Wd of the eighth via 68. A second end portion 49B of the ninth inductor wiring 49 is connected to the upper end of the 18th electrode layer 39 in the height direction Td. The wiring width of the first end portion 49A of the ninth inductor wiring 49 is larger than that of the other portion. The ninth inductor wiring 49 is wound counterclockwise from the first end portion 49A toward the second end portion 49B as seen from the first end side in the width direction Wd. The ninth inductor wiring 49 is exposed to the outside of the ninth layer L9 on its both sides in the width direction Wd.

The portion other than the 17th electrode layer 29, the 18th electrode layer 39, and the ninth inductor wiring 49 in the ninth layer L9 is the ninth insulating layer 59, which is an insulator, such as glass, resin, or alumina.

A first covering insulating layer 81 having the same substantially rectangular shape in plan view as that of the ninth layer L9 is laminated on the second end side in the width direction Wd of the ninth layer L9. A second covering insulating layer 82 having the same substantially rectangular shape in plan view as that of the first layer L1 is laminated on the first end side in the width direction Wd of the first layer L1.

The above-described first insulating layer 51 to ninth insulating layer 59, first covering insulating layer 81, second covering insulating layer 82, and insulator sections in the layers between neighboring ones of the first layer L1 to ninth layer L9 are made of the same material. When it is not necessary to distinguish them, they are collectively referred to as insulating layers 50 in the following description. The first inductor wiring 41 to ninth inductor wiring 49 and the first via 61 to eighth via 68 are made of the same material. When it is not necessary to distinguish them, they are collectively referred to as inductor wiring 40 in the following description. The central axis of winding of the inductor wiring 40 is substantially parallel with the width direction Wd.

The above-described first electrode layer 21, third electrode layer 22, fifth electrode layer 23, seventh electrode layer 24, ninth electrode layer 25, 11th electrode layer 26, 13th electrode layer 27, 15th electrode layer 28, and 17th electrode layer 29 are made of the same material. They function as a first inner electrode 20.

Similarly, the above-described second electrode layer 31, fourth electrode layer 32, sixth electrode layer 33, eighth electrode layer 34, tenth electrode layer 35, 12th electrode layer 36, 14th electrode layer 37, 16th electrode layer 38, and 18th electrode layer 39 are made of the same material. They function as a second inner electrode 30.

In the present embodiment, the insulating layers 50, first inner electrode 20, and second inner electrode 30 constitute a base 11 in the inductor component 10. The inductor wiring 40 is arranged inside the base 11.

Figure 2:
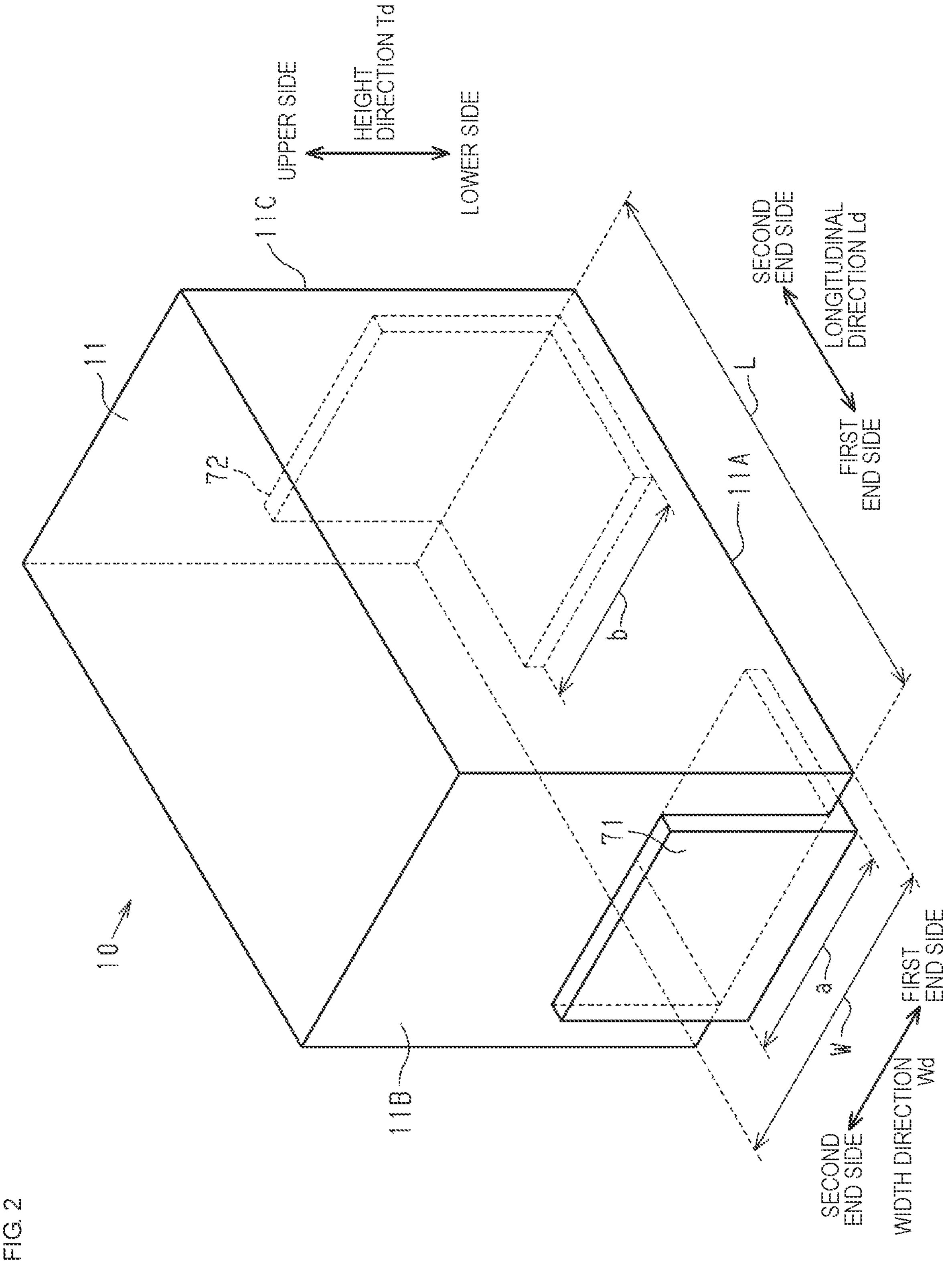
FIG. 2 is a perspective view of an inductor component.

As a result of laminating the first layer L1 to ninth layer L9, the first covering insulating layer 81, and the second covering insulating layer 82, as illustrated in FIG. 2, the base 11 has a substantially rectangular prism shape as a whole. The base 11 has a mounting surface 11A, which is its lower surface in the height direction Td, and the mounting surface 11A is substantially parallel with the length direction Ld and the width direction Wd.

A first outer electrode 71 is disposed on the outer surface of the base 11 and covers the exposed surface of the first inner electrode 20, which is not illustrated in FIG. 2, from the base 11. That is, the first outer electrode 71 is disposed on from the mounting surface 11A to a first end surface 11B on the first end side of the base 11 in the length direction Ld, in the outer surface of the base 11, and is exposed to the outside.

The first outer electrode 71 is made of a conductive material, such as nickel, tin, or gold, and is connected to the inductor wiring 40 with the first inner electrode 20 disposed therebetween. The first outer electrode 71 has a substantially bent rectangular shape as a whole and is substantially L-shaped as seen from the width direction Wd. The first outer electrode 71 is formed by plating. The dimension of the first outer electrode 71 in the width direction Wd is approximately uniform and is about 0.28 mm That is, the first outer electrode width a, which is the maximum dimension of the first outer electrode 71 in the width direction Wd, is about 0.28 mm. The dimension of the base 11 in the width direction Wd, that is, the width dimension W, which is the maximum dimension of the mounting surface 11A in the width direction Wd, is about 0.40 mm.

The first outer electrode 71 is substantially centered in the base 11 in the width direction Wd. Therefore, the surface of the base 11 is exposed to the outside on both sides of the first outer electrode 71 in the width direction Wd on the mounting surface 11A and the first end surface 11B. That is, the first outer electrode width a is smaller than the width dimension W. The portion in which the first outer electrode 71 is exposed is larger than the portion in which the first outer electrode 71 is not exposed in the width direction Wd on the mounting surface 11A and the first end surface 11B. That is, the first outer electrode width a is larger than about half the width dimension W.

A second outer electrode 72 is disposed on the outer surface of the base 11 and covers the exposed surface of the second inner electrode 30, which is not illustrated in FIG. 2, from the base 11. That is, the second outer electrode 72 is disposed on from the mounting surface 11A to a second end surface 11C on the second end side of the base 11 in the length direction Ld, in the outer surface of the base 11, and is exposed to the outside.

The second outer electrode 72 is made of a conductive material, such as nickel, tin, or gold, and is connected to the inductor wiring 40 with the second inner electrode 30 disposed therebetween. The second outer electrode 72 has a substantially bent rectangular shape as a whole and is substantially L-shaped as seen from the width direction Wd. The second outer electrode 72 is formed by plating. The dimension of the second outer electrode 72 in the width direction Wd is approximately uniform and is about 0.28 mm That is, the second outer electrode width b, which is the maximum dimension of the second outer electrode 72 in the width direction Wd, is about 0.28 mm. The second outer electrode 72 is substantially centered in the base 11 in the width direction Wd. Therefore, the surface of the base 11 is exposed to the outside on both sides of the second outer electrode 72 in the width direction Wd on the mounting surface 11A and the second end surface 11C. That is, the second outer electrode width b is smaller than the width dimension W. The portion in which the second outer electrode 72 is exposed is larger than the portion in which the second outer electrode 72 is not exposed in the width direction Wd on the mounting surface 11A and the second end surface 11C. That is, the second outer electrode width b is larger than about half the width dimension W.

Here, the first outer electrode 71 and the second outer electrode 72 on the mounting surface 11A are spaced and arranged in the length direction Ld. The length dimension L, which is the dimension of the base 11 in the length direction Ld, is about 0.60 mm Therefore, the length dimension L, which is the maximum dimension of the base 11 in the length direction Ld, is smaller than about twice the width dimension W.

Accordingly, the length dimension L, which is the maximum dimension of the mounting surface 11A in the longitudinal direction, that is, length direction Ld, the width dimension W, which is the maximum dimension of the mounting surface 11A in the width direction Wd, and the first outer electrode width a, which is the maximum dimension of the first outer electrode 71 in the width direction Wd, satisfy the following relationship:

$$W/2<a\leq L/2<W.$$

The length dimension L, which is the maximum dimension of the mounting surface 11A in the longitudinal direction, that is, length direction Ld, the width dimension W, which is the maximum dimension of the mounting surface 11A in the width direction Wd, and the second outer electrode width b, which is the maximum dimension of the second outer electrode 72 in the width direction Wd, satisfy the following relationship:

$$W/2<b\leq L/2<W.$$

Next, the actions and advantages of the above-described embodiment are described.

(1) According to the above-described embodiment, the length dimension L of the base 11 is about 0.60 mm, and the width dimension W of the base is about 0.40 mm Because the width dimension W is larger than about half the length dimension L, the width dimension W can be larger than a specified size, such as a standard size. Consequently, the volume of the base 11 can have an appropriate volume, and thus the characteristics of the inductor component 10 can be improved.

The first outer electrode width a and the second outer electrode width b are about 0.28 mm, which is smaller than about half the length dimension L of the base 11. Therefore, the first outer electrode width a and the second outer electrode width b can fit a specified size, such as a standard size.

Hence, according to the above-described embodiment, the characteristics of the inductor component 10 can be improved, and because it is not necessary to change land patterns for replacement for a component with a specified size, such as a standard size, and the likelihood of changing the land patterns on a substrate can be decreased. Therefore, for example, the cost of the replacement of the component can be reduced.

(2) According to the above-described embodiment, a larger dimension than about half the width dimension W is ensured as the first outer electrode width a and the second outer electrode width b. Therefore, the size of each of the first outer electrode 71 and the second outer electrode 72 is not excessively small with respect to the entire size of the base 11, and a situation is unlikely to arise in which it is difficult to mount the inductor component 10 on a mounting substrate.

(3) According to the above-described embodiment, the first outer electrode 71 and the second outer electrode 72 are disposed on not only the mounting surface 11A but the first end surface 11B and the second end surface 11C. Therefore, in comparison with the case where the first outer electrode 71 and the second outer electrode 72 are disposed on only the mounting surface 11A, the area of contact between the base 11 and each of the first outer electrode 71 and the second outer electrode 72 can be increased more easily. Therefore, the first outer electrode 71 and the second outer electrode 72 can be firmly fixed to the base 11 more easily.

(4) According to the above-described embodiment, because solder is applied along the first end surface 11B and the second end surface 11C, the reliability of mounting after mounting on the substrate can be easily confirmed. Specifically, it can be achieved by visually recognizing solder applied to the first end surface 11B and the first end surface 11B to confirm the mounting of the inductor component 10 by soldering.

The above-described embodiment can be changed as described below. The above-described embodiment and variations below can be combined in a range where they are not technically inconsistent.

In the above-described embodiment, the shape of the base 11 is not limited to the example described above. When the base 11 includes at least the mounting surface 11A, it may have any substantially columnar shape. For example, it may be a substantially polygonal prism shape other than a substantially rectangular prism shape or may be an approximately semi-cylinder shape in which a substantially cylinder is cut in part.

In the above-described embodiment, the arrangement of the first outer electrode 71 and the second outer electrode 72 is not limited to the example described above. The first outer electrode 71 and the second outer electrode 72 are arranged in the length direction Ld at least on the mounting surface 11A. For example, the first outer electrode 71 may not be disposed on the first end surface 11B, and the second outer electrode 72 may not be disposed on the second end surface 11C. The first outer electrode 71 may be disposed on from the mounting surface 11A to the first end surface 11B to the surface opposed to the mounting surface 11A, and the second outer electrode 72 may be disposed on from the mounting surface 11A to the second end surface 11C to the surface opposed to the mounting surface 11A.

In the above-described embodiment, the first outer electrode 71 may be integrated with the first inner electrode 20, and no boundary may be present between the first outer electrode 71 and the first inner electrode 20. The first outer electrode 71 may be flush with the outer surface of the base 11. In such cases, the portion exposed from the outer surface of the base 11 can be regarded as the first outer electrode 71.

In the above-described embodiment, the first outer electrode 71 may consist of a plurality of layers. For example, a two-layer structure consisting of a layer made of nickel and a layer made of tin laminated thereon may be configured as the first outer electrode 71. The same applies to the second outer electrode 72.

In the above-described embodiment, the first outer electrode 71 may be formed by a method other than plating. For example, the first outer electrode 71 may be formed by attaching a film made of a conductor.

In the above-described embodiment, the dimension of the first outer electrode 71 in the width direction Wd may not be approximately uniform. For example, the dimension of the first outer electrode 71 in the width direction Wd on the mounting surface 11A may decrease toward the first end surface 11B. In that case, the first outer electrode width a is the maximum dimension in the width direction Wd on the mounting surface 11A, and if the dimension in the width direction Wd varies depending on the location, the longest dimension in the width direction Wd when the mounting surface 11A is seen from the height direction Td is measured. The same applies to the second outer electrode 72. The second outer electrode width b is the maximum dimension in the width direction Wd on the mounting surface 11A.

In the above-described embodiment, the width dimension W may be not less than about twice the first outer electrode width a and the second outer electrode width b. Even in that case, an increase in the size of the base 11 is not hindered. When the first outer electrode width a and the second outer electrode width b are designed for specifications, the size of the base 11 can also be increased.

In the above-described embodiment, the length dimension L of the base 11 is not limited to the example described above. Among standard sizes for inductor components, as more common ones, in addition to about 0.6 mm, about 0.4 mm and about 0.25 mm are known as the length dimension L. A dimensional error of the order of 0.5% is allowable for such common sizes. Accordingly, the length dimension L may preferably be not less than about 0.57 mm and not more than about 0.63 mm (i.e., from about 0.57 mm to about 0.63 mm), not less than about 0.38 mm and not more than 0.42 mm (i.e., from about 0.38 mm to 0.42 mm), or not less than about 0.237 mm and not more than about 0.263 mm (i.e., from about 0.237 mm to about 0.263 mm). In the cases where the length dimension L is in those ranges, it is approximately equal to the length dimension L in a common-size inductor component, and thus it is easy to mount the component by using common-size land patterns, which are more frequently used, as they are.

Figure 3:
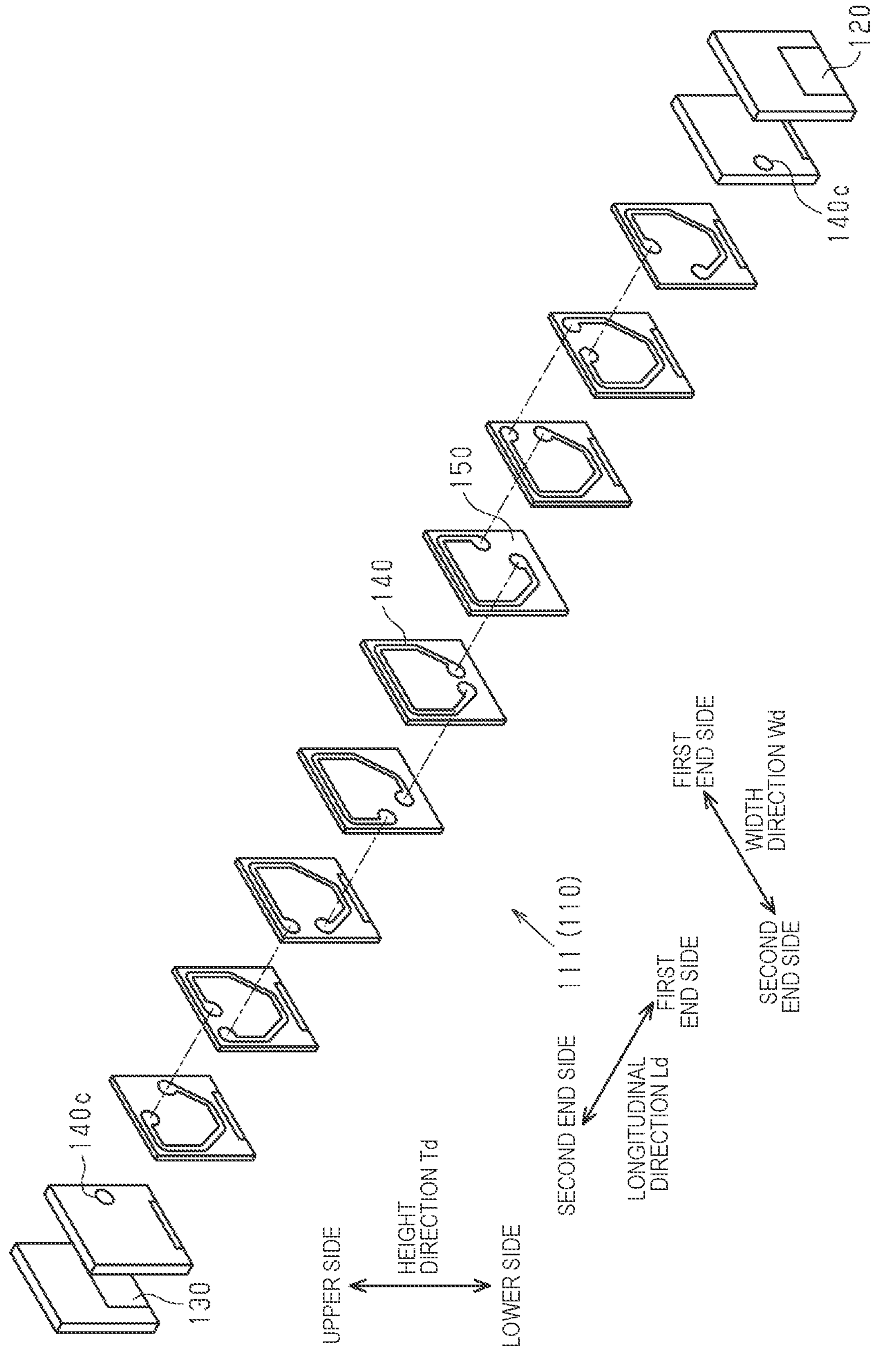
FIG. 3 is an exploded perspective view of an inductor component according to a variation.
Figure 4:
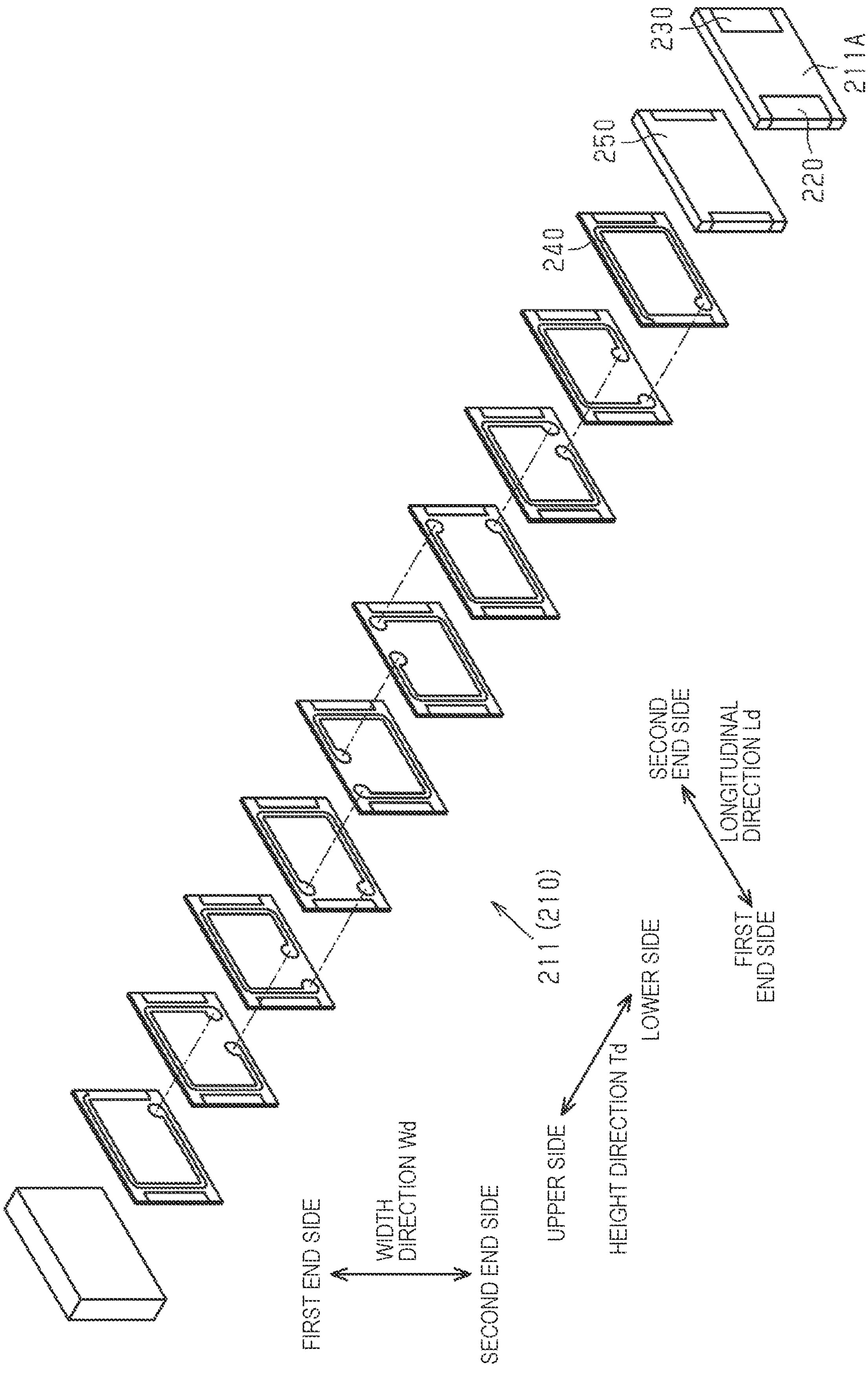
FIG. 4 is an exploded perspective view of an inductor component according to another variation.

In the above-described embodiment, the configuration of the inductor wiring 40 is not limited to the example described above. For example, as illustrated in FIG. 3, layers in a base 111 in an inductor component 110 being an example variation of the above-described embodiment are laminated in the length direction Ld. The base 111 includes inductor wiring 140, insulating layers 150, a first inner electrode 120, and a second inner electrode 130. The central axis of winding of the inductor wiring 140 may be substantially parallel with the length direction Ld. In that case, the direction in which the layers are laminated may be the length direction Ld. To connect both end portions of the inductor wiring 140 to the first inner electrode 120 and the second inner electrode 130, the end portions of the inductor wiring 140 may be vias 140*c*. When the central axis of winding of the inductor wiring 140 extends in the above-described direction, the inductor wiring 140 can be wound in a shape closer a perfect circle. In that case, the number of layers laminated can be increased. In FIG. 3, the reference numerals are used in only some of the plurality of members. In another variation, as illustrated in FIG. 4, layers in a base 211 in an inductor component 210 are laminated in the height direction Td. The base 211 includes inductor wiring 240, an insulating layer 250, a first inner electrode 220, and a second inner electrode 230. The central axis of winding of the inductor wiring 240 may be substantially parallel with the height direction Td, that is, substantially perpendicular to a mounting surface 211A. In that case, the radius of winding of the inductor wiring 240 can be increased. When the component is mounted on the same substrate as that on which the inductor in the embodiment illustrated in FIGS. 1 and 2 or the inductor in the variation illustrated in FIG. 3 is mounted, interference with a magnetic flux of that inductor can be reduced. In FIG. 4, the reference numerals are used in only some of the plurality of members.

In the above-described embodiment, the inductor wiring may be any wiring capable of providing the inductor component with inductance by producing a magnetic flux when a current flows therethrough.

In the above-described embodiment, the inductor wiring may have any shape. The inductor wiring may have a linear shape or a meander shape. The configuration of the base is not limited to a multilayer one and may correspond to the shape of the inductor wiring.

In the above-described embodiment, the insulator being the material of the insulating layer is not limited to a nonmagnetic material and may be a magnetic material, such as ferrite or resin containing magnetic powder.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:

a base having a columnar shape, and including a mounting surface parallel with a length direction being a longitudinal direction of the columnar shape and with a width direction orthogonal to the length direction;

inductor wiring arranged inside the base;

a first outer electrode connected to the inductor wiring and disposed on the mounting surface; and a second outer electrode connected to the inductor wiring and disposed on the mounting surface, the first outer electrode and the second outer electrode being arranged in the length direction, wherein $$a \leq L/2 < W$$

and $$b \leq L/2 < W$$

where L is a maximum dimension of the mounting surface in the length direction,

W is a maximum dimension of the mounting surface in the width direction, a is a maximum dimension of the first outer electrode in the width direction, b is maximum dimension of the second outer electrode in the width direction, and a maximum dimension of the base in the length direction is equal to or less than 0.63 mm.

2. The inductor component according to claim 1, wherein $$a > W/2$$

and $$b \geq > W/2.$$

3. The inductor component according to claim 1, wherein the first outer electrode is disposed on from the mounting surface to a first end surface on a first end side in the length direction of the base, and the second outer electrode is disposed on from the mounting surface to a second end surface on a second end side in the length direction of the base.

4. The inductor component according to claim 1, wherein the maximum dimension of the base in the length direction is from 0.57 mm to 0.63 mm, from 0.38 mm to 0.42 mm, or from 0.237 mm to 0.263 mm.

5. The inductor component according to claim 2, wherein the first outer electrode is disposed on from the mounting surface to a first end surface on a first end side in the length direction of the base, and the second outer electrode is disposed on from the mounting surface to a second end surface on a second end side in the length direction of the base.

6. The inductor component according to claim 2, wherein the maximum dimension of the base in the length direction is from 0.57 mm to 0.63 mm, from 0.38 mm to 0.42 mm, or from 0.237 mm to 0.263 mm.

7. The inductor component according to claim 3, wherein the maximum dimension of the base in the length direction is from 0.57 mm to 0.63 mm,
from 0.38 mm to 0.42 mm, or
from 0.237 mm to 0.263 mm.

8. The inductor component according to claim 5, wherein the maximum dimension of the base in the length direction is from 0.57 mm to 0.63 mm,
from 0.38 mm to 0.42 mm, or
from 0.237 mm to 0.263 mm.

* * * * *